(12) United States Patent
Tang et al.

(10) Patent No.: US 12,553,202 B2
(45) Date of Patent: Feb. 17, 2026

(54) HEATED GRIPS

(71) Applicant: TECHTRONIC CORDLESS GP, Anderson, SC (US)

(72) Inventors: Mathew Tang, Central, SC (US); Shuai Shao, Simpsonville, SC (US); Grzegorz Kondro, Piedmont, SC (US); Michael Scott Bailey, Powdersville, SC (US); Thomas Kolangayil James, Greenville, SC (US); Jack Yu Jie, DongGuan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 978 days.

(21) Appl. No.: 17/714,523

(22) Filed: Apr. 6, 2022

(65) Prior Publication Data

US 2023/0323617 A1 Oct. 12, 2023

(51) Int. Cl.
*E01H 5/09* (2006.01)
*H05B 1/02* (2006.01)
*H05B 3/34* (2006.01)

(52) U.S. Cl.
CPC ........... *E01H 5/098* (2013.01); *H05B 1/0213* (2013.01); *H05B 3/34* (2013.01)

(58) Field of Classification Search
CPC .......... H05B 1/0213; H05B 3/34; E01H 5/04; E01H 5/098
See application file for complete search history.

(56) References Cited

U.S. PATENT DOCUMENTS

| | | | |
|---|---|---|---|
| 6,903,312 B2 | 6/2005 | Miura | |
| 6,927,367 B2 | 8/2005 | Livingstone | |
| 6,998,576 B2 | 2/2006 | Marquis | |
| 7,064,292 B1 | 6/2006 | Oishi | |
| 7,291,814 B2 | 11/2007 | Oishi | |
| 7,389,842 B2 | 6/2008 | Inoguchi | |
| 7,671,299 B2 | 3/2010 | Gifford | |
| 8,558,140 B2 | 10/2013 | Fitzgerald | |
| 8,680,436 B2 | 3/2014 | Schmauder | |
| 10,220,904 B2 | 3/2019 | Sasaki | |
| 2002/0108274 A1* | 8/2002 | Dowe | E01H 5/04 37/257 |
| 2003/0226836 A1* | 12/2003 | Miura | B62K 21/26 219/202 |
| 2005/0055832 A1 | 3/2005 | Jaensch | |

(Continued)

FOREIGN PATENT DOCUMENTS

| CA | 2069157 A1 | 11/1993 |
|---|---|---|
| CA | 2931410 A1 | 11/2017 |

(Continued)

OTHER PUBLICATIONS

European Search Report Corresponding with Application No. EP23166225 on Jul. 27, 2023 (2 pages).

*Primary Examiner* — Thien S Tran
(74) *Attorney, Agent, or Firm* — Dority & Manning, P.A.

(57) ABSTRACT

Power tools, snow throwers, and heated grips for snow throwers are provided. An exemplary heated grip for a power tool having a handle configured to be engaged by an operator includes a first heating element configured to be disposed at least partially on a first side of the handle; and a second heating element configured to be disposed at least partially on a second side of the handle, wherein the first heating element is moveable relative to the second heating element.

20 Claims, 3 Drawing Sheets

(56) References Cited

U.S. PATENT DOCUMENTS

| | | | |
|---|---|---|---|
| 2005/0072772 A1* | 4/2005 | Livingstone | B01D 53/228 |
| | | | 219/494 |
| 2005/0173406 A1* | 8/2005 | Kurumagawa | B62K 21/26 |
| | | | 219/482 |
| 2006/0043085 A1 | 3/2006 | Meyers | |
| 2008/0272102 A1 | 11/2008 | Farrington | |
| 2009/0038184 A1 | 2/2009 | Kornienko | |
| 2011/0232038 A1 | 9/2011 | Miller | |
| 2012/0179226 A1 | 7/2012 | Graham | |
| 2018/0194420 A1* | 7/2018 | Sasaki | B62K 21/26 |
| 2020/0114999 A1 | 4/2020 | Rhodes | |
| 2020/0316444 A1 | 10/2020 | King | |
| 2021/0137085 A1 | 5/2021 | Cherry | |
| 2021/0139101 A1 | 5/2021 | Eaton | |

FOREIGN PATENT DOCUMENTS

| | | | | |
|---|---|---|---|---|
| CN | 2594136 | Y | 12/2003 | |
| CN | 2752157 | Y | 1/2006 | |
| CN | 2853580 | Y | 1/2007 | |
| CN | 201002688 | Y | 1/2008 | |
| CN | 101519103 | A | 9/2009 | |
| CN | 105035226 | A | 11/2015 | |
| CN | 106476951 | A | 3/2017 | |
| CN | 106892037 | A | 6/2017 | |
| CN | 206394767 | U | 8/2017 | |
| CN | 206579755 | U | 10/2017 | |
| DE | 3036641 | A1 | 5/1982 | |
| DE | 8613613 | U1 | 7/1986 | |
| DE | 8617528 | U1 | 8/1986 | |
| DE | 9421524 | U1 | 1/1996 | |
| DE | 202005013294 | U1 | 11/2005 | |
| EP | 2829462 | B1 | 1/2015 | |
| GB | 2545262 | A | 6/2017 | |
| JP | 2004010016 | A * | 1/2004 | |
| JP | 4485811 | B2 | 7/2005 | |
| JP | 4628768 | B2 | 6/2006 | |
| JP | 4939025 | B2 | 4/2007 | |
| WO | WO-2010025619 | A1 * | 3/2010 | A01D 34/828 |

* cited by examiner

HEATED GRIPS

FIELD

The present disclosure relates generally to heated grips, and more particularly to heated grips for power tools such as snow throwers.

BACKGROUND

Power tools are generally utilized to make working conditions easier. For example, snow throwers eliminate the need for shoveling snow. Instead of manually lifting snow from a surface (e.g., a driveway or sidewalk) to move the snow therefrom, the operator can push or walk a snow thrower through the snow. The snow thrower lifts the snow and discharges it a distance from the underlying surface. In this regard, snow throwers make snow removal easier than previous manual operations. However, operating the snow thrower in the cold can result in cold hands which can make use of the snow thrower less enjoyable.

Accordingly, snow throwers with improved user interfaces are desired in the art. In particular, snow throwers which provide heated user interfaces would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a power tool is provided. The power tool includes a frame; a prime mover; a work element coupled to the frame and driven by the prime mover; a handle extending from the frame; and a heated grip comprising: a first heating element disposed at least partially on a first side of the handle; and a second heating element disposed at least partially on a second side of the handle, wherein the first heating element is moveable relative to the second heating element.

In accordance with another embodiment, a snow thrower is provided. The snow thrower includes an actuatable member movably coupled to a handle of the snow thrower, the actuatable member being moveable between a first position and a second position to control one or more operational aspects of the snow thrower; and a heated grip comprising: a first heating element coupled to the actuatable member; and a second heating element coupled to the handle, wherein the first and second heating elements together surround at least 50% of a circumference of a first gripping area of the handle when the first and second heating elements are disposed at operational positions closest to the handle.

In accordance with another embodiment, a heated grip for a power tool having a handle configured to be engaged by an operator is provided. The heated grip includes a first heating element configured to be disposed at least partially on a first side of the handle; and a second heating element configured to be disposed at least partially on the second side of the handle, wherein the first heating element is moveable relative to the second heating element.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion.

For example, a process, method, article, or apparatus that comprises a list of features is not necessarily limited only to those features but may include other features not expressly listed or inherent to such process, method, article, or apparatus. Further, unless expressly gated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, power tools in accordance with one or more embodiments of the present disclosure can be intended for use in cold environments. Exemplary power tools include snow throwers. When using cold weather power tools such as snow throwers, the operator's hands may become cold. In accordance with embodiments described herein, the power tool includes heated grips to keep the operator's hands warm. The heated grips are disposed along the power tool such that the heated grips contact the operator's hands. The power tool defines a first gripping area including an actuatable member movably coupled to a handle of the power tool. A heated grip disposed at the first gripping area can include a plurality of heating elements split between the handle and the actuatable member such that the operator's hands remain warm even when the actuatable member is not actively engaged and instead spaced apart from the handle. In this regard, at least some of the plurality of heating elements can move relative to others of the plurality of heating elements.

Figure 1:
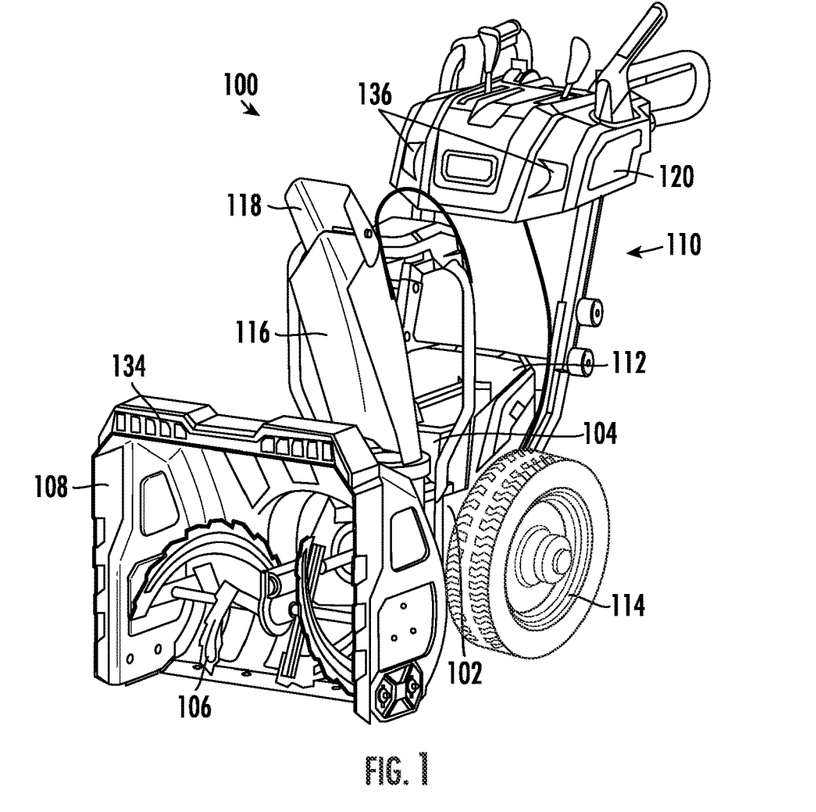
FIG. 1 is a front perspective view of a snow thrower in accordance with embodiments of the present disclosure.

Referring now to the drawings, FIG. 1 illustrates a snow thrower 100 in accordance with an exemplary embodiment of the present disclosure. The snow thrower 100 generally includes a frame 102, a prime mover 104, a work element such as an auger 106 coupled to the frame 102, such as disposed in an auger housing 108, and a handle 110 extending from the frame 102. As illustrated, the handle 110 can extend from a rear end of the frame in a generally vertical direction. A battery compartment 112 can be coupled to the frame 102 to receive one or more batteries (not illustrated) which can provide power to the prime mover 104 (e.g., an electric motor). In other embodiments, prime mover 104 can include an engine powered by fuel. In such embodiments, the battery compartment 112 can be replaced or supplemented with a fuel storage tank (not illustrated) which stores fuel for powering the engine.

The snow thrower 100 is supported by walking elements, e.g., wheels 114. The wheels 114 can be driven by a motor (not illustrated) or the snow thrower 100 can be pushed by an operator during use.

Figure 2:
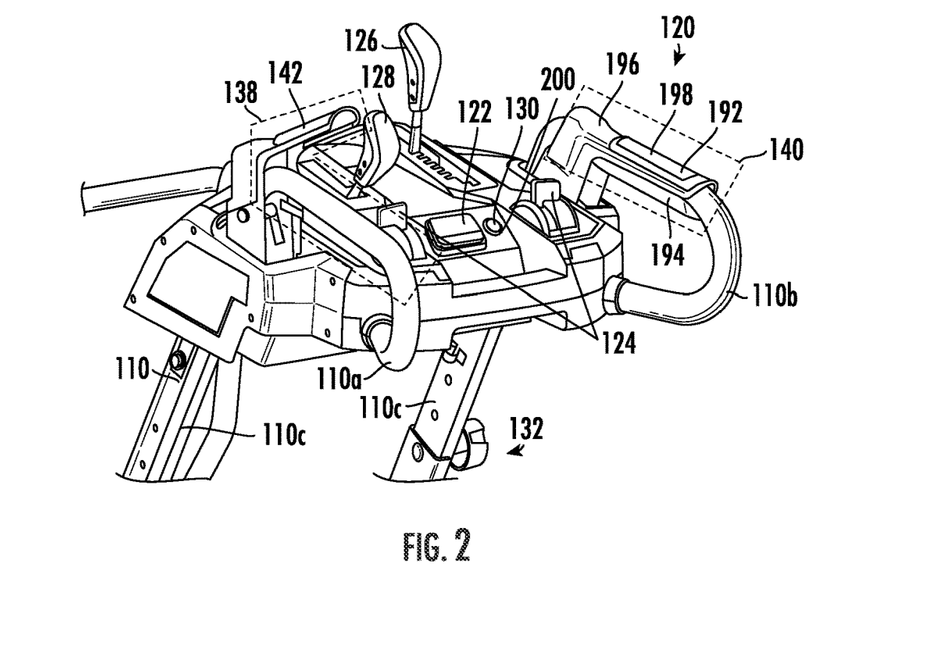
FIG. 2 is a rear perspective view of a portion of the snow thrower in accordance with embodiments of the present disclosure.

The snow thrower 100 can include one or more lighting elements (e.g., one or more light emitting diodes, commonly referred to as LEDs) configured to illuminate one or more areas of the environment in which the snow thrower 100 is operating. For example, the snow thrower 100 can include a first light 134 disposed on the auger housing 108. By way of another example, the snow thrower 100 can include a second light 136 disposed on the control platform 120. In some instances, at least one of the first and second lights 134 and 136 can automatically turn on when the snow thrower 100 is in use. In other instances, at least one of the first and second lights 134 and 136 can be manually actuatable, e.g., at control located on the control platform 120.

The auger housing 108 can be in fluid communication with a chute 116. The chute 116 can extend, for example, above the auger housing 108. The chute 116 can direct discharged snow in a desired direction. In an embodiment, the chute 116 can rotate about a vertical axis. The chute 116 can include a moveable interface 118 configured to rotate the discharge direction about a horizontal axis. In this regard, the direction and height of discharged snow can be controlled.

In certain instances, the direction of at least one of the chute 116 and moveable interface 118 can be controlled by the operator at the handle 110. For instance, the handle 110 can include a control platform 120 illustrated in FIG. 2. The control platform 120 can include one or more controls associated with controlling operational aspect(s) of the snow thrower 100. By way of non-limiting example, the control platform 120 can include a power button 122, one or more speed switches 124, a controller 126 which rotates the chute 116, and a controller 128 which rotates the moveable interface 118. A user actuatable control 130 can control one or more heated grips of the snow thrower 100, described in greater detail below.

The handle 110 can include a first portion 110a and a second portion 110b. In some instances, the first and second portions 110a and 110b can form a single piece, i.e., the first and second portions 110a and 110b can each be part of a single-piece construction handle. In other instances, the handle 110 can include a multi-piece construction. In multi-piece embodiments, the first and second portions 110a and 110b can each include discrete, separate components coupled together. The first and second portions 110a and 110b can be coupled to one or more additional portions 110c which extend from the frame 102 to the first and second portions 110a and 110b. In the depicted embodiment, the handle 110 includes two third portions 110c. Each of the two third portions 110c can include an adjustable interface 132 which allows the operator to adjust an effective height of the first and second portions 110a and 110b. As used herein, the term handle is intended to refer to any of the above-described configurations, as well as any other readily discernable variations thereof. The disclosure is not limited to the depicted embodiment.

When using the snow thrower 100, the operator holds or guides the handle 110, e.g., the first and second portions 110a and 110b of the handle 110, to maintain the snow thrower 100 oriented and moving in a desired direction. The handle 110 can form two separate gripping areas—a first gripping area 138 and a second gripping area 140. The first and second gripping areas 138 and 140 can be spaced apart from one another. For example, the first gripping area 138 can be associated with the first portion 110a of the handle 110 and the second gripping area 140 can be associated with the second portion 110b of the handle 110.

In the illustrated embodiment, the operator grasps the gripping areas 138 and 140 by wrapping their hands around the gripping areas 138 and 140. The first gripping area 138 includes an actuatable member 142 which is moveable relative to the handle 110, and more particularly moveable relative to the first portion 110a of the handle 110. The actuatable member 142 can control one or more operational aspects of the snow thrower 100. For instance, the actuatable member 142 can control rotation of the auger 106, rotation of the wheels 114, or the like. As depicted in FIGS. 1 and 2, the actuatable member 142 is in a first position. The actuatable member 142 can be rotated from the first position to a second position shown in FIG. 3. The second position can correspond with a rotated position whereby the actuatable member 142 is adjacent to the handle 110, and more particularly adjacent to the first portion 110a of the handle 110. Actuating the actuatable member 142 to the second position can affect one or more operational aspects of the snow thrower 100. For example, actuating the actuatable member 142 to the second position can engage the auger 106 to rotate. The auger 106 can continue to rotate until the actuatable member 142 is returned to the first position. In one or more embodiments, the actuatable member 142 can be spring biased to the first position such that the actuatable member 142 automatically returns to the first position upon release. In some embodiments, the location of the first and second gripping areas may be reversed such that the first gripping area 138 may be disposed above the second portion 110b and the second gripping area 140 may be disposed above the first portion 110a.

Referring again to FIG. 2, in some instances, the second gripping area 140 can include a second actuatable member (not illustrated) having one or more similar or different characteristics as compared to the actuatable member 142. The second actuatable member can control a same or different operational aspect of the snow thrower 100 as compared to the actuatable member 142. In other instances, the second gripping area 140 can form a passive gripping area which is grasped by the operator to control, e.g., a direction of, the snow thrower 100 but which does not include an actuatable member.

When operating the snow thrower 100, the operator may be exposed to cold conditions and it is possible their hands will become cold (for example, in situation where the operator is not using insulated gloves or is using the snow thrower 100 over extended periods). In accordance with embodiments contemplated herein, the snow thrower 100 includes heated grip(s) which assist the operator in maintaining warmth when using the snow thrower 100. The heated grips can be controlled by the previously described user actuatable control 130. In this regard, the operator can turn the heated grip(s) on and off utilizing the user actuatable control 130 disposed at the control panel 120. As described in greater detail below, the heated grips can receive power from one or more power sources, such as the aforementioned one or more batteries or other batteries dedicated to powering aspects of control platform 120.

Figure 3:
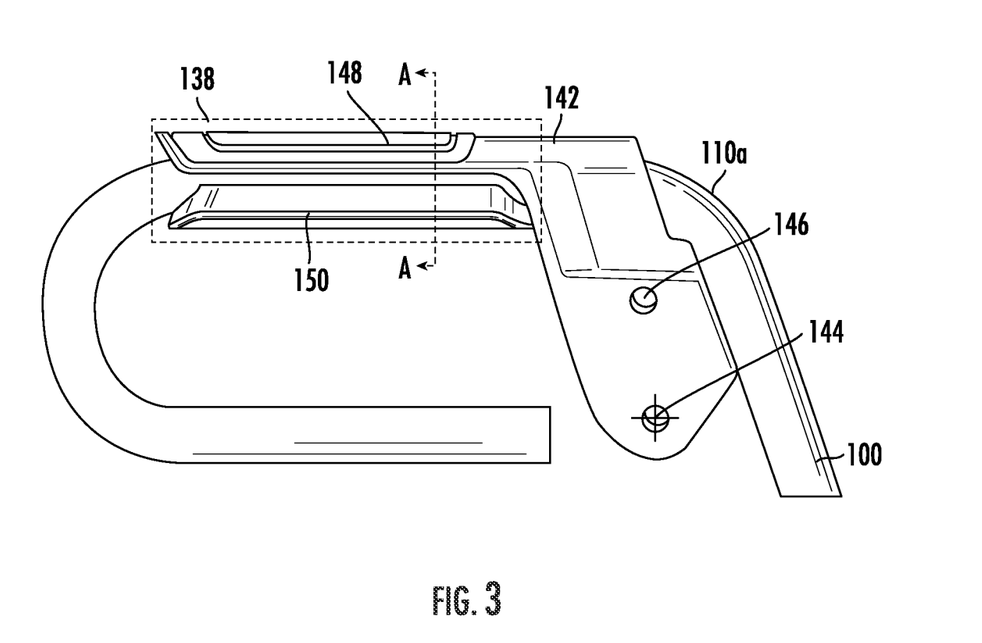
FIG. 3 is a side view of a first handle portion of the snow thrower in accordance with embodiments of the present disclosure.

FIG. 3 illustrates a side view of the first portion 110a of the handle 110 with the actuatable member 142 rotatably coupled therewith and disposed in the second position, i.e., nearest the handle 110. The actuatable member 142 can be rotatably coupled to the first portion 110a of the handle 110, e.g., about an axis 144. An opening 146 in the actuatable member 142 can receive a biasing element (not illustrated), e.g., a spring, configured to return the actuatable member 142 to the first position as depicted in FIGS. 1 and 2 when the operator releases the actuatable member 142. Opening 146 may be disposed within the housing of control platform 120 as illustrated in FIGS. 1 and 2.

As depicted in FIG. 3, the first gripping area 138 includes a heated grip formed by an upper heated grip 148 and a lower heated grip 150. The upper heated grip 148 is coupled to the actuatable member 142. The lower heated grip 150 is coupled to the handle 110, and more particularly the first portion 110a of the handle 110. In inverse configurations, i.e., when the actuatable member 142 is disposed below the handle 110 and pulled upward to the handle 110, the upper heated grip 148 can be coupled to the handle 110 and the lower heated grip 150 can be coupled to the actuatable member 142.

Figure 4:
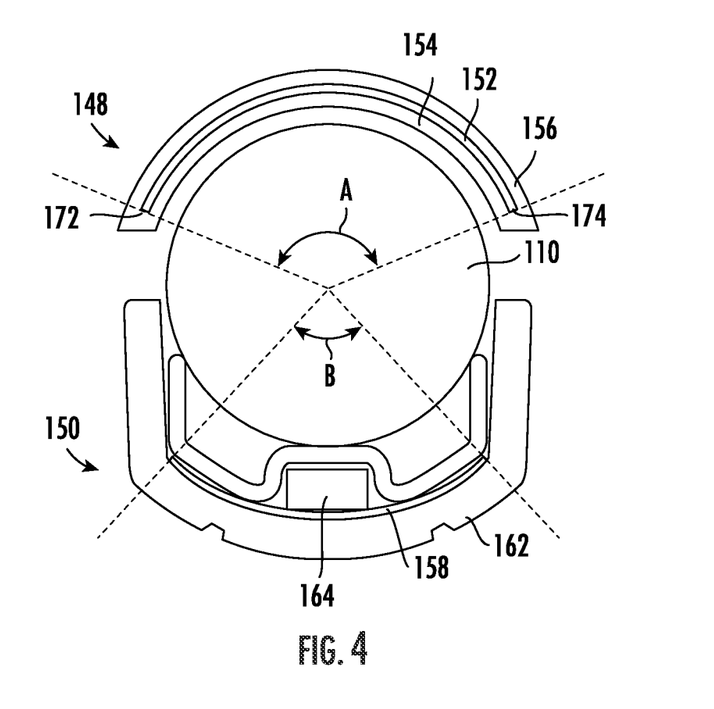
FIG. 4 is a cross-sectional view of the first handle portion of the snow thrower as seen along Line A-A in FIG. 3 in accordance with embodiments of the present disclosure.

FIG. 4 depicts a cross-sectional view of the first gripping area 138 as seen along Line A-A in FIG. 3. The upper heated grip 148 includes a first heating element 152. The first heating element 152 can be disposed between a shell 154 and a cover 156. In an embodiment, the shell 154 can form the actuating member 142. The shell 154 can define a recess which receives the first heating element 152. The cover 156 can cover the recess. In this regard, the first heating element 152 can be disposed between, e.g., sandwiched between, the shell 154 and the cover 156. By way of non-limiting example, the cover 156 can be coupled to the shell 154 by a threaded member, snap fit, interference fit, sonically welded, adhered, or any combination thereof. The cover 156 or even the shell 154 can include a thermally conductive material to transmit heat from the first heating element 152 to the operator.

The lower heated grip 150 includes a second heating element 158. The first and second heating elements 152 and 158 can be moveable with respect to one another. More particularly, at least one of the first and second heating elements 152 and 158 can be rotatable with respect to the other of the first and second heating elements 152. For example, the actuatable member 142 may be rotatable such that the first heating element 152 rotates relative to the second heating element 158.

The second heating element 158 can be disposed between an inner member 160 and an outer member 162. The inner member 162 can be disposed adjacent to the handle 110. The second heating element 158 can be disposed between, e.g., compressed between, the inner member 160 and the outer member 162. In an embodiment, elements of the lower heated grip 158 can be coupled together using one or more, e.g., rivets. For instance, by way of non-limiting example, the outer member 162 can be coupled to the handle 110 using a blind rivet. The outer member 162 can form a contact interface for the operator when the snow thrower 100 is in use. The outer member 162 or even the inner member 160 can include a thermally conductive material to transmit heat from the second heating element 158 to the operator.

As depicted, the first and second heating elements 152 and 158 together surround a portion of a circumference of the first gripping area 138 when the actuatable member 142 is in the second position, i.e., when the first and second heating elements 152 and 158 are disposed at operational positions closest to the handle 110.

The first heating element 152 can surround a first angular distance A of the first gripping area 138, as measured for example from a central axis of the handle 110. For example, the first heating element 152 surrounds a portion [A/360] of the circumference of the first gripping area 138. The second heating element 158 can surround a second angular distance B of the first gripping area 138, as measured for example from the central axis of the handle 110. For example, the second heating element 158 surrounds a portion [B/360] of the circumference of the first gripping area 138. Together, the first and second heating elements 152 and 158 surround a portion of the circumference of the first gripping area 138 corresponding with [(A/360)+(B/360)]. In an embodiment, the first and second heating elements 152 and 158 together [(A/360)+(B/360)] surround at least 25% of the circumference of the first gripping area 138, such as at least 50% of the circumference of the first gripping area 138, such as at least 60% of the circumference of the first gripping area 138, such as at least 70% of the circumference of the first gripping area 138, such as at least 75% of the circumference of the first gripping area 138, such as at least 80% of the circumference of the first gripping area 138, such as at least 85% of the circumference of the first gripping area 138, such as at least 90% of the circumference of the first gripping area 138, such as at least 95% of the circumference of the first gripping area 138, such as at least 97% of the circumference of the first gripping area 138, such as at least 98% of the circumference of the first gripping area 138, such as at least 99% of the circumference of the first gripping area 138. In an embodiment, the first and second heating elements 152 and 158 together [(A/360)+(B/360)] surround 100% of the circumference of the first gripping area 138.

In some instances, the first and second heating elements 152 and 158 can surround the same relative circumferential portion of the first gripping area 138 as compared to one another. That is, by way of non-limiting example, the first and second heating elements 152 and 158 can each surround 35% of the circumference of the first gripping area 138. In other instances, the first and second heating elements 152 and 158 can surround different relative circumferential portions of the first gripping area 138 as compared to one another. That is, the first heating element 152 can surround a first amount of the circumference of the first gripping area 138 (e.g., 30% of the circumference) and the second heating element 158 can surround a second amount of the circumference of the first gripping area 138 different than the first amount (e.g., 35% of the circumference).

The snow thrower 100 can include a mechanism to control the first and second heating elements 152 and 158. The mechanism can be, e.g., a thermostat. By way of non-limiting example, the thermostat can include a switch 164 which senses temperature at the first gripping area 138. In some instances, the switch 164 is a passive temperature controller, e.g., a bimetal switch. When the temperature reaches operating temperature (e.g., 65 degrees Celsius), the passive switch 164 can maintain that temperature at, or around, the operating temperature. In other instances, the switch 164 can be an active temperature controller, e.g., allowing the operator to select a desired temperature, e.g., through a user interface (e.g., positioned on control platform 120).

In the depicted embodiment, the switch 164 is disposed between the inner member 160 and the second heating element 158. The inner member 160 can define a receiving area, e.g., a recess, in which the switch 164 can be disposed. The switch 164 can contact the second heating element 158. In another embodiment, the switch 164 can be disposed between a different combination of elements of the lower heated grip 150 or be disposed at the upper heated grip 148.

In one or more embodiments, the switch 164 can control activation and deactivation of both the first and second heating elements 152 and 158. In another embodiment, the switch 164 can control only one of the first and second heating elements 152 and 158. A second switch (not illustrated) may be used to control the other of the first and second heating elements 152 and 158. Similar to the placement of the switch 164, the second switch can be disposed between the first heating element 152 and the cover 156 or between the first heating element 152 and the shell 154. Alternatively, the second switch can be disposed external to the shell 154 and cover 156. Yet other arrangements are possible In certain instances, the first and second heating elements 152 and 158 can share one or more common attributes. In other instances, the first and second heating elements 152 and 158 can have one or more different attributes as compared to one another. By way of example, at least one of the first and second heating elements 152 and 158 can include a body formed from a flexible material. For instance, the body can be formed from a sheet, a tape, an applied material, e.g., a curable liquid, or the like. At least one of the first and second heating elements 152 and 158 can include an interface where the body of the first or second heating element 152 or 158 is interfaced with one or more wires (not illustrated) which electrically connect the first or second heating element 152 or 158 to a power source, e.g., an onboard battery. The interface between the heating element 152 or 158 and the body can include, for example, a connector, a welded joint, an epoxy joint, or the like.

Figure 5:
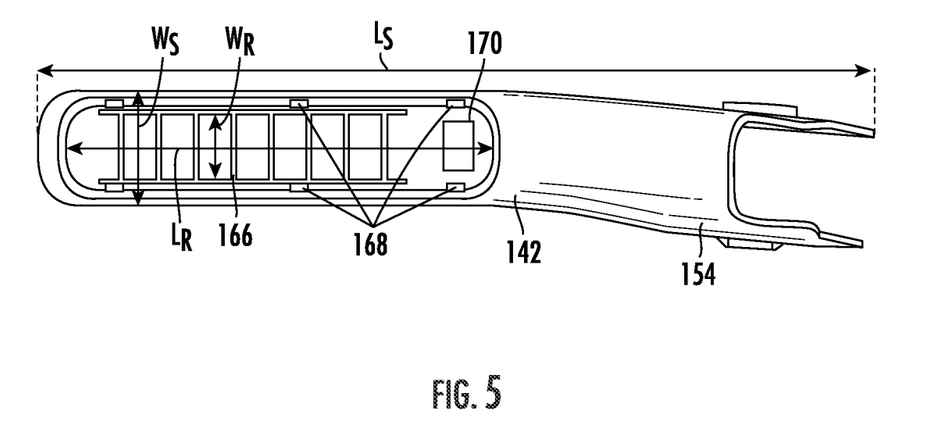
FIG. 5 is a top view of a portion of an actuatable member of the snow thrower in accordance with embodiments of the present disclosure.

FIG. 5 illustrates a top view of the shell 154 of the actuatable member 142 with the cover 156 removed to reveal a recess 166 in which the first heating element 152 is disposable. As depicted, the recess 166 has a length $L_R$ that extends along a length $L_S$ of the shell 154. In an embodiment, $L_R$ can be less than 0.99 $L_S$, such as less than 0.95 $L_S$, such as less than 0.9 $L_S$, such as less than 0.8 $L_S$, such as less than 0.7 $L_S$, such as less than 0.6 $L_S$, such as less than 0.5 $L_S$. In one or more embodiments, the length $L_S$ of the shell 154 can correspond to, e.g., be equal to, the overall length of the actuatable member 142.

In an embodiment, the recess 166 can define a width $W_R$ that is no greater than a width $W_S$ of the shell 154. For example, $W_R$ can be less than 0.99 $W_S$, such as less than 0.95 $W_S$, such as less than 0.9 $W_S$, such as less than 0.85 $W_S$, such as less than 0.8 $W_S$, such as less than 0.7 $W_S$, such as less than 0.6 $W_S$, such as less than 0.5 $W_S$.

Referring again to FIG. 4, the first heating element 152 can have a cross-sectional profile, as seen in a plane oriented perpendicular to an axis of the handle 110 in the first gripping area 138, which lies along a curved line, e.g., an arcuate shape. In this regard, the width of the first heating element 152, as measured between opposite ends 172 and 174 when the first heating element 152 is flat, can be greater than the width $W_R$ of the recess 166.

As depicted in FIG. 5, the shell 154 can include one or more interfaces configured to engage with one or more complementary interfaces of the cover 156 to attach the cover 156 to the shell 154. By way of non-limiting example, the cover 156 can include one or more posts which extend from the cover 156 and through openings 168 in the shell 154. The posts can include features, e.g., tabs, which extend from the posts and which snap into the openings 168 to attach the cover 156 to the shell 154.

In an embodiment, a portion of the actuatable element 142, e.g., the shell 154, can define a wire routing passage 170 which allows wires of the first heating element 152 to pass through the shell 154. The wires can then extend to an area of the snow thrower 100 where they can be electrically coupled with a power supply of the snow thrower 100 (e.g., a battery).

Figure 6:
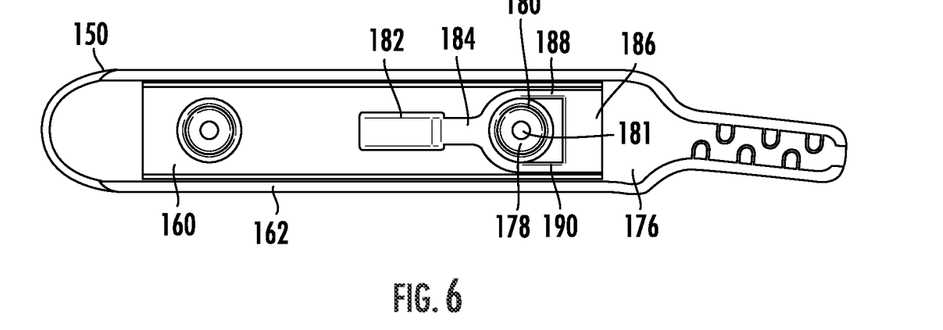
FIG. 6 is a top view of a portion of a lower heated grip of the snow thrower in accordance with embodiments of the present disclosure.

FIG. 6 illustrates a view of the lower heated grip 150 as seen when looking from the handle 110 in a downward direction away from the actuatable member 142. The inner member 160 is disposed within a recess 176 of the outer member 162. The second heating element 158 (not seen in FIG. 6) can be disposed, e.g., sandwiched, between the inner member 160 and the outer member 162. In certain instances, the second heating element 158 can have an areal size less than an areal size of the inner member 160 within recess 176. In this regard, no portion of the second heating element 158 extends past the inner member 160. This can prevent the operator from accidently contacting the second heating element 158 directly.

In an embodiment, the outer member 162 can include one or more features 178, such as one or more posts, which are receivable in one or more complementary features 180, such as one or more openings, of the inner member 160. The second heating element 158 can also include one or more complementary features (not illustrated) which allow the second heating element 158 to be disposed between the inner and outer members 160 and 162. In an embodiment, the inner and outer members 160 and 162 can snap together. In another embodiment, the inner and outer members 160 and 162 can be fastened together, e.g., connected together through one or more threaded or non-threaded fasteners. In yet another embodiment, the features 178 of the outer member 162 can extend through the complementary features 180 (e.g., openings) in the inner member 160 and the second heating element 158 and a rivet 181 can fasten the elements together.

In accordance with an embodiment, the inner member 160 can define a receiving area 182 in which the switch 164 (FIG. 4) can be disposed. The inner member 160 can further define a wire routing passage 184 through which the wires from any one or more of the switch 164 and second heating element 152 can extend. The wire routing passage 184 can extend from the receiving area 182 to an end 186 of the inner member 160. In an embodiment, the wire routing passage 184 can define a first passageway 188 disposed along a first side of the complementary feature 180 and a second passageway 190 disposed along a second side of the complementary feature 180.

Referring again to FIG. 2, the second gripping area 140 can include an upper heated grip 192 and a lower heated grip 194. The upper and lower heated grips 192 and 194 can have any number of similar or different characteristics as compared to the upper and lower heated grips 148 and 150. For instance, by way of non-limiting example, the upper heated grip 192 can be formed from a shell 196 having a cover 198 covering a third heating element (not illustrated) while the lower heated grip 194 can include an inner member (not illustrated) and an outer member 162 covering a fourth heating element (not illustrated). In an embodiment, the lower heated grip 194 can include a switch (not illustrated) which can be similar to or different from the switch 164 associated with the first gripping area 138. In another embodiment, the upper and lower heated grips 192 and 194 of the second gripping area 138 can be controlled by the switch 164 associated with the first gripping area 138. It should be understood that the third and fourth heating elements can be similar to, or even the same as, the first and second heating elements 152 and 158 described herein. For instance, in a particular embodiment, all of the first, second, third, and fourth heating elements can include flexible bodies with wires connected thereto to electrically couple the heating element to a power source. In an embodiment, the third and fourth heating elements can remain in a generally fixed spatial relationship with respect to one another during operational use of the snow thrower 100. That is, while the first and second heating elements 152 and 158 can move relative to one another as part of movement of the actuatable member 142, the third and fourth heating elements can remain relatively fixed with respect to one another.

As depicted, the second gripping area 140 is static, i.e., there is no actuatable member 142. Instead, the second gripping area 140 may provide a gripping surface for the operator to control movement the snow thrower 100 without providing operational control of any systems of the snow thrower 100. It should be understood that in accordance with one or more non-illustrated embodiments, the second gripping area 140 can include an actuatable member. In one instance, the actuatable member of the second gripping area 140 can perform the same function as the actuatable member 142. For example, the actuatable member of the second gripping area 140 can be used in lieu of the actuatable member 142 to control the operational aspect of the snow thrower 100. Alternatively, the actuatable member of the second gripping area 140 can be used in concert with the actuatable member 142, i.e., both actuatable members must be utilized to control the operational aspect of the snow thrower 100.

The first and second gripping areas 138 and 140 may be operated at the same temperatures as compared to one another. For example, both the first and second gripping areas 138 and 140 can operate at approximately 65 degrees Celsius. In some instances, the temperature of at least one of the first or second gripping areas 138 or 140 can be adjustable, for example, by controls positioned on control platform 120. In an embodiment, the temperature of the first and second gripping areas 138 and 140 can be individually controlled. For example, the first gripping area 138 can operate at a first temperature and the second gripping area 140 can be operated at a second temperature different from the first temperature. In another embodiment, the temperature of the first and second gripping areas 138 and 140 can be controlled simultaneously such that the temperatures of the first and second gripping areas 138 and 140 are within a range of one another (e.g., within 5 degrees Celsius, such as within 4 degrees Celsius, such as within 3 degrees Celsius, such as within 2 degrees Celsius). An indicator 200 may be disposed on the control platform 120 to indicate to the operator when the first and second gripping areas 138 and 140 are heating, heated, or not heated. In an embodiment, a status of the indicator 200 can change based on whether the first and second gripping areas 138 and 140 are heating, heated, or not heated. For example, the indicator 200 may remain solidly lit when the first and second gripping areas 138 and 140 are heated or heating. The indicator 200 may flash when the first and second gripping areas 138 and 140 are heating. The indicator 200 may be off when the first and second gripping areas 138 and 140 are not heated. Other indications are possible. For instance, the indicator 200 can change between colors, brightness profiles, or the like. Moreover, the indicator 200 can include a non-visual indicator, such as a tactile indicator (e.g., a vibration generator), an audible indicator, or the like.

Figure 7:
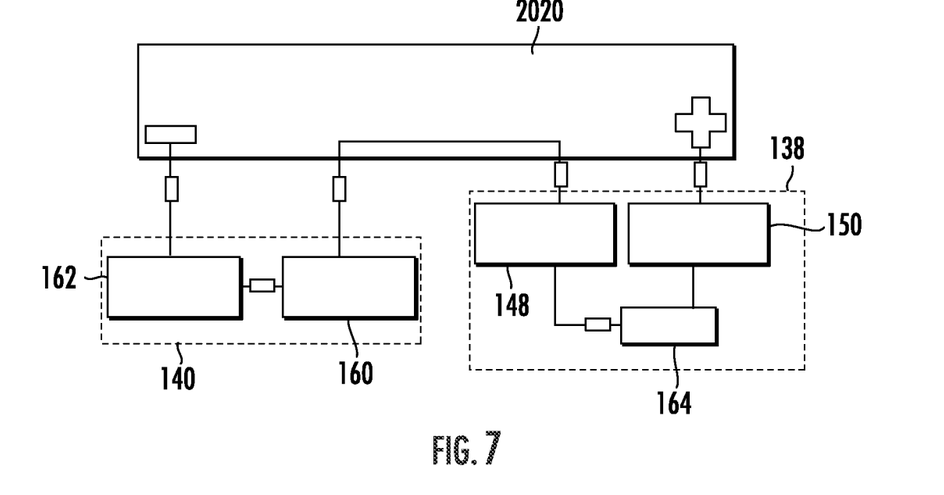
FIG. 7 is a simplified, schematic wiring of the snow thrower in accordance with embodiments of the present disclosure.

FIG. 7 illustrates a simplified, schematic wiring for the snow thrower 100. A controller 202 is coupled to the first gripping area 138 which includes the upper heated grip 148 and the lower heated grip 150. The controller 202 is further coupled to the second gripping area 138 which includes the inner member 160 and the outer member 162. As depicted, the switch 164 is disposed at the first gripping area 138. However, as previously noted, the switch 164 (or more than one switch) may be disposed at the second gripping area 140 or at both the first and second gripping areas 138 and 140. In the illustrated embodiment, the elements of the first and second gripping areas 138 and 140 are connected together in series. In another embodiment, at least two of the elements of at least one of the first and second gripping areas 138 and 140 are coupled together in parallel. The aforementioned wire routing passages can route the wires between the elements of the first and second gripping areas 138 and 140. In some instances, the wiring can extend continuously. In other embodiments, the wiring can include a plurality of wire segments. The controller 202 can control the heated grips in response to the operator's use of the actuatable control 130.

It should be understood that snow throwers 100 in accordance with embodiments herein generally include heating elements which provide a more even heat to the operator's hands. Additionally, unlike traditional heated grips, the use of an upper heated grip 148 on the actuatable member 142 can allow the operator's hands to remain warm even when the actuatable member is not actively depressed, i.e., in the second position. Moreover, when the operator releases the actuatable member 142 and removes their hands therefrom, the upper heated grip 148 can maintain the temperature at a desired level such that the temperature is warm when the operator again places their hands on the actuatable member 142. While embodiments described herein pertain specifically to snow throwers, it should be understood that in one or more embodiments, the heated grips may be utilized with different tools and objects, and more particularly with different tools and objects which are used in cold environments.

Further aspects of the invention are provided by one or more of the following embodiments:

Embodiment 1. A power tool comprising: a frame; a prime mover; a work element coupled to the frame and driven by the prime mover; a handle extending from the frame; and a heated grip comprising: a first heating element disposed at least partially on a first side of the handle; and a second heating element disposed at least partially on a second side of the handle, wherein the first heating element is moveable relative to the second heating element.

Embodiment 2. The power tool of any one or more of the embodiments, wherein the power tool further comprises an actuatable member movably coupled to the handle, the actuatable member being moveable between a first position and a second position to control one or more operational aspects of the power tool, wherein the first heating element is coupled to the actuatable member, and wherein the second heating element is coupled to the handle.

Embodiment 3. The power tool of any one or more of the embodiments, wherein the actuatable member comprises: a shell; and a cover disposed over at least a portion of the shell, wherein the first heating element is at least partially disposed between the shell and the cover, and wherein the shell is configured to be contacted by the operator during use of the power tool.

Embodiment 4. The power tool of any one or more of the embodiments, wherein the first heating element is sandwiched between the shell and the cover, and wherein the first heating element has an arcuate shape as seen in a cross-sectional plane oriented perpendicular to an axis of the handle in a first gripping area of the handle associated with the actuatable member.

Embodiment 5. The power tool of any one or more of the embodiments, wherein at least one of the first and second heating elements comprises a flexible body in electrical communication with one or more wires, the one or more wires configured to provide electricity to the flexible body, wherein the actuatable member comprises a wire routing passage, and wherein the one or more wires extend through the wire routing passage.

Embodiment 6. The heated grip of any one or more of the embodiments, wherein the first and second heating elements together surround at least 50% of a circumference of a first gripping area of the handle when the first heating element is disposed at an operational position closest to the handle.

Embodiment 7. The power tool of any one or more of the embodiments, wherein the second heating element is disposed between an outer member and an inner member, wherein the inner member is disposed between the handle and the outer member, and wherein the outer member is configured to be contacted by an operator during use of the power tool.

Embodiment 8. The power tool of any one or more of the embodiments, wherein the first and second heating elements are at least partially controlled by a bimetal switch disposed between the inner member and the outer member.

Embodiment 9. The power tool of any one or more of the embodiments, wherein the inner member and the outer member have a same thermal conductivity as one another.

Embodiment 10. The power tool of any one or more of the embodiments, wherein the power tool further comprises an actuatable member forming a first gripping area of the handle, the handle further comprising a second gripping area spaced apart from the first gripping area, the second gripping area comprising a second heated grip.

Embodiment 11. The power tool of any one or more of the embodiments, wherein the second heated grip comprises: a third heating element disposed at least partially on a first side of the handle; and a fourth heating element disposed at least partially on a second side of the handle.

Embodiment 12. The power tool of any one or more of the embodiments, wherein the third and fourth heating elements remain in a fixed spatial relationship with respect to one another during operational use of the power tool.

Embodiment 13. The power tool of any one or more of the embodiments, wherein the power tool comprises a snow thrower, and wherein the work element comprises an auger.

Embodiment 14. A snow thrower comprising: an actuatable member movably coupled to a handle of the snow thrower, the actuatable member being moveable between a first position and a second position to control one or more operational aspects of the snow thrower; and a heated grip comprising: a first heating element coupled to the actuatable member; and a second heating element coupled to the handle, wherein the first and second heating elements together surround at least 50% of a circumference of a first gripping area of the handle when the first and second heating elements are disposed at operational positions closest to the handle.

Embodiment 15. The snow thrower of any one or more of the embodiments, wherein the actuatable member comprises a shell and a cover disposed over at least a portion of the shell, and wherein the first heating element is disposed at least partially between the shell and the cover.

Embodiment 16. The snow thrower of any one or more of the embodiments, wherein the second heating element is disposed between an outer member and an inner member, wherein the inner member is disposed between the handle and the outer member, and wherein the outer member is configured to be contacted by the operator during use of the snow thrower.

Embodiment 17. The snow thrower of any one or more of the embodiments, wherein the actuatable member forms a first gripping area of the handle, the handle further comprising a second gripping area spaced apart from the first gripping area, the second gripping area comprising a second heated grip, wherein the second heated grip comprises a third heating element disposed on a first side of the handle and a fourth heating element disposed on a second side of the handle.

Embodiment 18. A heated grip for a power tool having a handle configured to be engaged by an operator, the heated grip comprising: a first heating element configured to be disposed at least partially on a first side of the handle; and a second heating element configured to be disposed at least partially on a second side of the handle, wherein the first heating element is moveable relative to the second heating element.

Embodiment 19. The heated grip of any one or more of the embodiments, wherein the first heating element is disposed within an upper heated grip, wherein the second heating element is disposed within a lower heated grip, and wherein the upper heated grip is configured to be disposed above the lower heated grip.

Embodiment 20. The heated grip of any one or more of the embodiments, wherein the upper heated grip is configured to be coupled to the handle or an actuatable member moveably coupled to the handle, and wherein the lower heated grip is configured to be coupled to the other of the handle or the actuatable member.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A power tool comprising:
a frame;
a prime mover;
a work element coupled to the frame and driven by the prime mover;
a handle extending from the frame; and
a heated grip comprising:
a first heating element disposed at least partially on a first side of the handle; and
a second heating element disposed at least partially on a second side of the handle,
wherein the first heating element is moveable relative to the second heating element, and the first and second heating elements together extend around less than an entire circumference of the handle as seen in cross section when viewed in a direction parallel to a length of the handle at a location of the cross section.

2. The power tool of claim 1, wherein the power tool further comprises an actuatable member movably coupled to the handle, the actuatable member being moveable between a first position and a second position to control one or more operational aspects of the power tool, wherein the first heating element is coupled to the actuatable member, and wherein the second heating element is coupled to the handle.

3. The power tool of claim 2, wherein the actuatable member comprises:
a shell; and
a cover disposed over at least a portion of the shell,
wherein the first heating element is at least partially disposed between the shell and the cover, and wherein the shell is configured to be contacted by an operator during use of the power tool.

4. The power tool of claim 3, wherein the first heating element is sandwiched between the shell and the cover, and wherein the first heating element has an arcuate shape as seen in a cross-sectional plane oriented perpendicular to an axis of the handle in a first gripping area of the handle associated with the actuatable member.

5. The power tool of claim 2, wherein at least one of the first and second heating elements comprises a flexible body in electrical communication with one or more wires, the one or more wires configured to provide electricity to the flexible body, wherein the actuatable member comprises a wire routing passage, and wherein the one or more wires extend through the wire routing passage.

6. The power tool of claim 1, wherein the first and second heating elements together surround at least 50% of a circumference of a first gripping area of the handle when the first heating element is disposed at an operational position closest to the handle.

7. The power tool of claim 1, wherein the second heating element is disposed between an outer member and an inner member, wherein the inner member is disposed between the handle and the outer member, and wherein the outer member is configured to be contacted by an operator during use of the power tool.

8. The power tool of claim 7, wherein the first and second heating elements are at least partially controlled by a bimetal switch disposed between the inner member and the outer member.

9. The power tool of claim 7, wherein the inner member and the outer member have a same thermal conductivity as one another.

10. The power tool of claim 1, wherein the power tool further comprises an actuatable member forming a first gripping area of the handle, the handle further comprising a second gripping area spaced apart from the first gripping area, the second gripping area comprising a second heated grip.

11. The power tool of claim 10, wherein the second heated grip comprises:
a third heating element disposed at least partially on a first side of the handle; and
a fourth heating element disposed at least partially on a second side of the handle.

12. The power tool of claim 11, wherein the third and fourth heating elements remain in a fixed spatial relationship with respect to one another during operational use of the power tool.

13. The power tool of claim 1, wherein the power tool comprises a snow thrower, and wherein the work element comprises an auger.

14. A snow thrower comprising:
an actuatable member movably coupled to a handle of the snow thrower, the actuatable member being moveable between a first position and a second position to control one or more operational aspects of the snow thrower; and
a heated grip comprising:
a first heating element coupled to the actuatable member; and a second heating element coupled to the handle,
wherein the first and second heating elements together extend around less than an entire circumference of the handle as seen in cross section when viewed in a direction parallel to a length of the handle at a location of the cross section.

15. The snow thrower of claim 14, wherein the actuatable member comprises a shell and a cover disposed over at least a portion of the shell, and wherein the first heating element is disposed at least partially between the shell and the cover.

16. The snow thrower of claim 14, wherein the second heating element is disposed between an outer member and an inner member, wherein the inner member is disposed between the handle and the outer member, and wherein the outer member is configured to be contacted by the operator during use of the snow thrower.

17. The snow thrower of claim 14, wherein the actuatable member forms a first gripping area of the handle, the handle further comprising a second gripping area spaced apart from the first gripping area, the second gripping area comprising a second heated grip, wherein the second heated grip comprises a third heating element disposed on a first side of the handle and a fourth heating element disposed on a second side of the handle.

18. A heated grip for a power tool having a handle configured to be engaged by an operator, the heated grip comprising:
a first heating element configured to be disposed at least partially on a first side of the handle; and
a second heating element configured to be disposed at least partially on a second side of the handle,
wherein the first heating element is moveable relative to the second heating element, and
wherein the first and second heating elements together extend around less than an entire circumference of the handle as seen in cross section when viewed in a direction parallel to a length of the handle at a location of the cross section.

19. The heated grip of claim 18, wherein the first heating element is disposed within an upper heated grip, wherein the second heating element is disposed within a lower heated grip, and wherein the upper heated grip is configured to be disposed above the lower heated grip.

20. The heated grip of claim 19, wherein the upper heated grip is configured to be coupled to the handle or an actuatable member moveably coupled to the handle, and wherein the lower heated grip is configured to be coupled to the other of the handle or the actuatable member.

* * * * *